Aug. 27, 1963 W. F. BERCK 3,101,924
SHUT-OFF VALVE FOR METERED FLOWS
Filed Dec. 26, 1961 3 Sheets-Sheet 1

INVENTOR:
WILLIAM F. BERCK
BY
Mellin and Hanscom
ATTORNEYS

INVENTOR:
WILLIAM F. BERCK
BY
Mellin and Hanscom
ATTORNEYS

Aug. 27, 1963    W. F. BERCK    3,101,924
SHUT-OFF VALVE FOR METERED FLOWS
Filed Dec. 26, 1961    3 Sheets-Sheet 3
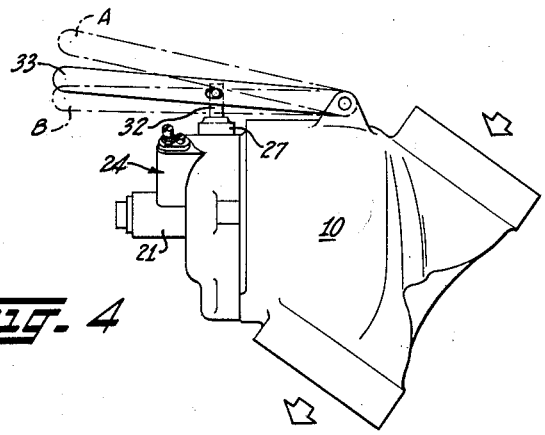
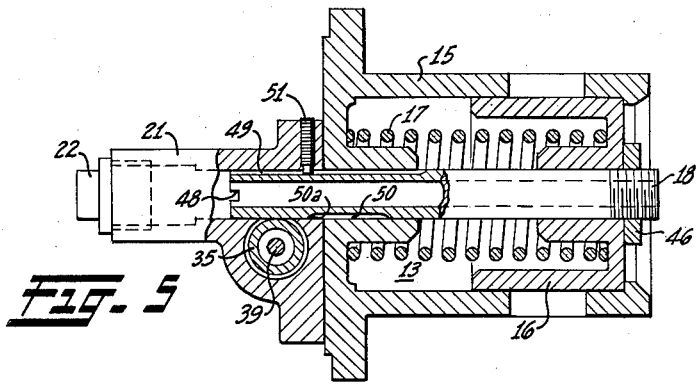
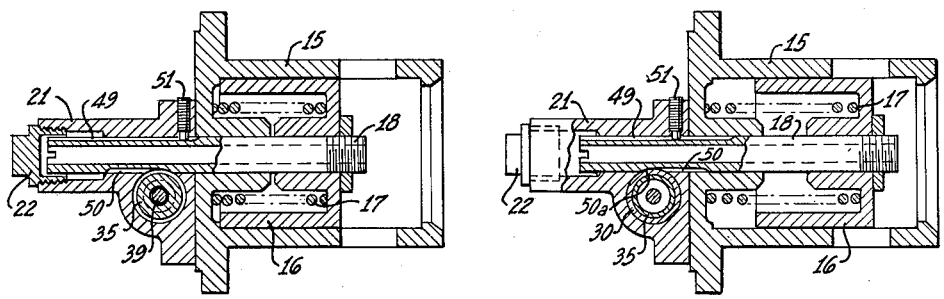
INVENTOR:
WILLIAM F. BERCK
BY
Mellin and Hanscom
ATTORNEYS

United States Patent Office 3,101,924
Patented Aug. 27, 1963

3,101,924
SHUT-OFF VALVE FOR METERED FLOWS
William F. Berck, Hayward, Calif., assignor to Ralph N. Brodie Company, San Leandro, Calif., a corporation of California
Filed Dec. 26, 1961, Ser. No. 161,859
18 Claims. (Cl. 251—25)

This invention relates to a shut-off valve device for metered flow lines and more particularly involves a valve structure having positions of full-open, closed and an intermediate position of registrable low flow.

In the art of metering fluid flows it is well known that fluid meters are accurate only within a given range; and although modern meters are remarkably accurate over a wide range of fluid flows, they are, nevertheless, inaccurate when operating at very low rates of flow, which results in an over-delivery of fluid for the quantity registered. While an over-delivery may be but a very small percentage of the total volume recorded, it will become significant in volume and value when large volume deliveries are made.

The problem of accurately recording under low flow rate conditions has been existent for many years. This problem is especially important to the petroleum industry where consolidation of operations with concomitant conservation of man power often places the matter of fluid dispensing and deliveries in the hands of the customer. For example, major oil companies have installed what are known as unattended bulk plant stations, no company employee being present to supervise the loading of delivery trucks. In this type of operation bulk purchasers are issued keys which give them access to the station and control the operation of pumps, valves and interlocks. The key of each purchaser differs from the keys of other purchasers so that the amount of fluid withdrawal made with each key may be determined and recorded on separate totalizing counters. The purchasers are then billed for the number of gallons shown on their respective counter. Because the station is unsupervised, any purchaser could operate the shut-off valve so as to run the meter very slowly for the entire delivery, thereby deriving a substantial over-delivery for the amount actually registered.

A primary object of this invention is to provide a shut-off valve device for metered flow lines which will effectively prevent unregistered over-deliveries of fluids.

Another object of this invention is to provide a shut-off valve device for metered flow lines comprising a main valve and a control or pilot valve therefor, said control valve being manually operable to produce snap actuation of the main valve between fully open and closed positions, and having means associated with manual actuation thereof for securing the main valve in a fixed, predetermined and intermediate position of low flow, said intermediate position being utilized for a "topping off" delivery of fluid.

A further object of this invention is to provide a shut-off valve device for metered flow lines and of the kind described having an intermediate position of low flow which may be adjusted to a rate within the accuracy range of a given meter.

It is still another object to provide a shut-off valve device for metered flow lines and of the kind described, said valve comprising a main valve and a control or pilot valve therefor, and further including an adjustable flow restriction for regulating the responsiveness of the main valve.

Other objects of this invention will become apparent in view of the following description and the accompanying drawings.

In brief, this invention comprises a main valve structure having features similar to those shown in U.S. Patent No. 2,841,359 and including a main valve element movable to and from its closed position by fluid pressures which are directed onto the element by a control or pilot valve element. The control valve of the present invention, as with the prior art structure, may be manually operated for opening and closing the main valve element. However, there is also provided a stop means associated with movement of the control valve element for securing the main valve element at a fixed, predetermined position intermediate full-open and closed positions. The novel valve structure is more particularly constructed to be operated with snap action toward full-open and closed positions, the stop means being movable with manual operation of the control valve element. It will be seen that the stop means secures the main valve element in its intermediate position after the main valve has been fully opened and while the valve element is moving toward its closed position. Further, the responsiveness of the main valve element to operation of its control valve may be regulated by an adjustable flow restriction.

In the drawings forming a part of this application and in which like parts are identified by like reference numerals throughout the same, FIG. 1 is a section of a novel shut-off valve as constructed in accordance with the teaching of this invention;

FIG. 4 is a plan view of the valve structure showing the manual operating handle for the control valve, including alternative positions of operation;

FIG. 5 is a partial section taken on lines 5—5 of FIG. 1;

FIG. 6 is a partial section taken on lines 6—6 of FIG. 2; and

FIG. 7 is a partial section taken on lines 7—7 of FIG. 3.

Figure 1:
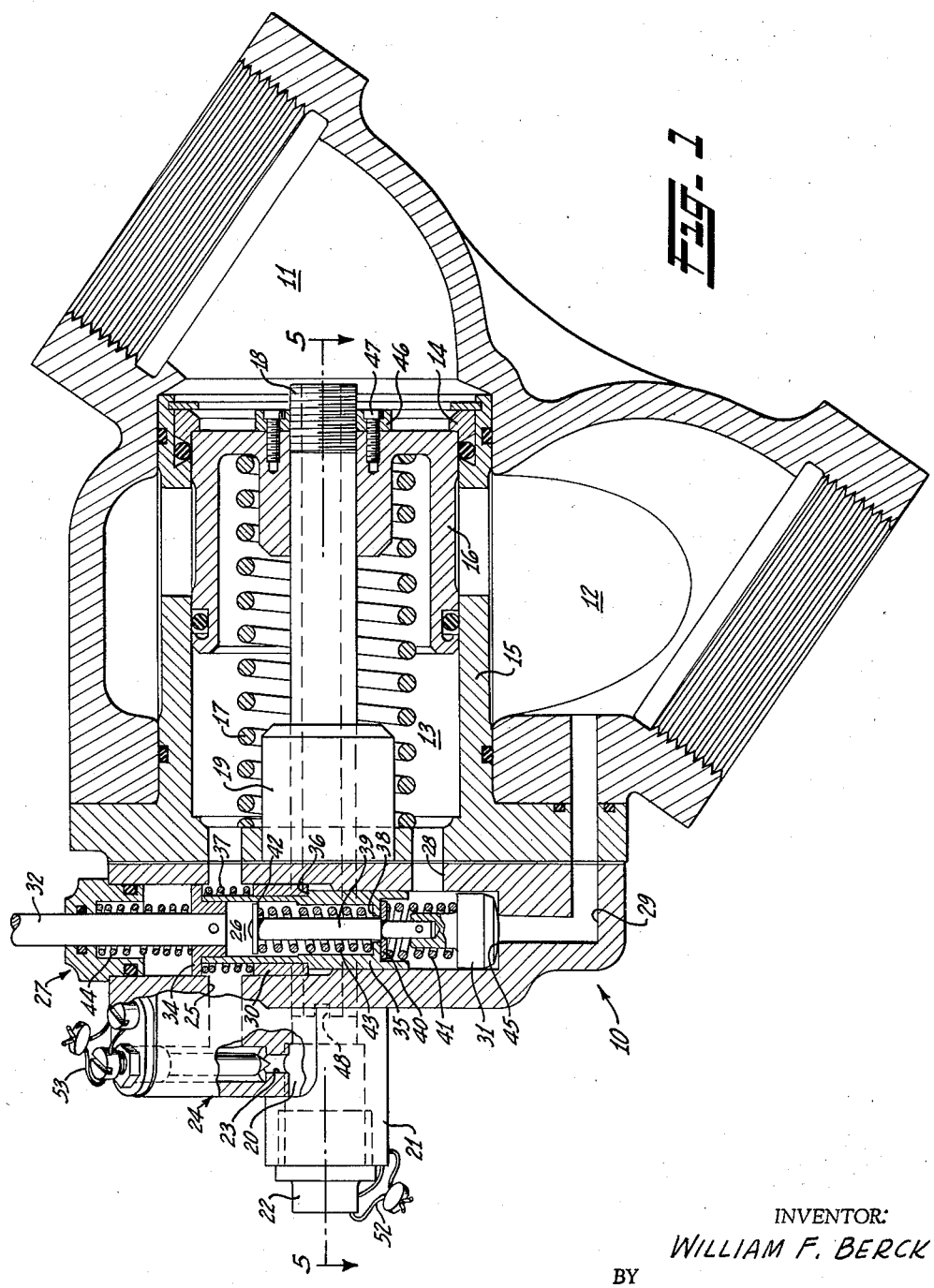

Referring to FIGS. 1 and 4 especially, there is shown a preferred embodiment of the invention in valve structures comprising a valve housing 10 having a main inlet chamber 11, an outlet chamber 12 and an intermediate valve chamber 13. Inlet chamber 11 and outlet chamber 12 are arranged to be connected to threaded inflow and outflow pipe connections, and are fluidly communicable with valve chamber 13 through a valve seat 14 and the port openings formed in an inner cylindrical wall 15.

A piston valve element 16 is disposed within chamber 13 and the confines of wall 15, said element engaging the valve seat 14 at the inner end of chamber 11 to prevent fluid from flowing through the housing. Piston 16 is urged against the valve seat 14 by a coiled spring 17 but may be moved into the wall 15 by the upstream pressure of fluid within chamber 11 unless that upstream pressure is balanced by a substantially equal pressure on the opposite side of the piston within chamber 13. This valve structure is similar to that shown and described in U.S. Patent No. 2,841,359.

Figure 2:
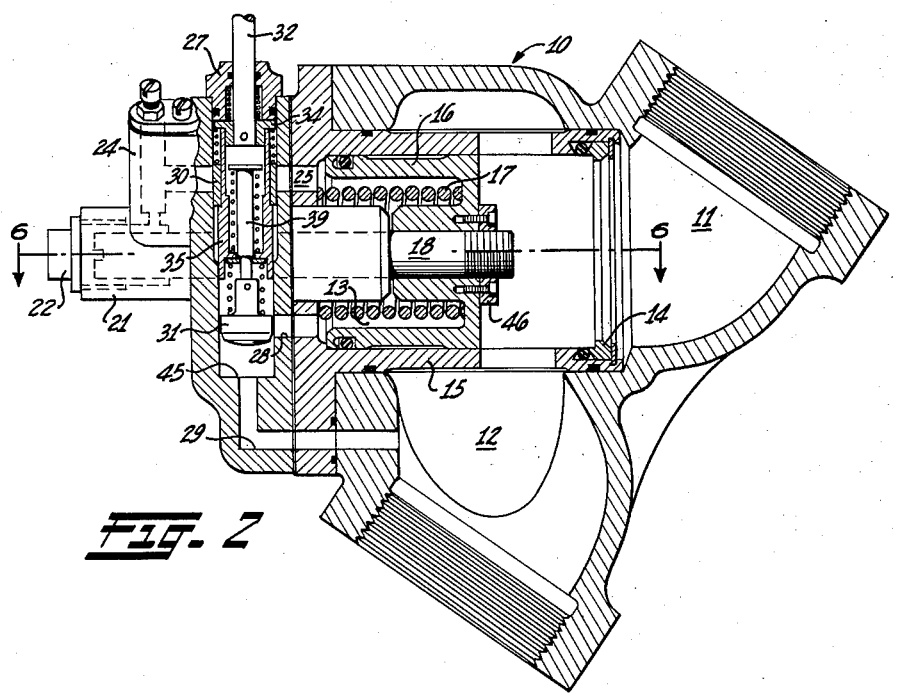
FIG. 2 is a section of the valve structure shown in FIG. 1 but illustrating the structural relationship of parts with the valve in a fully-open position.
Figure 3:
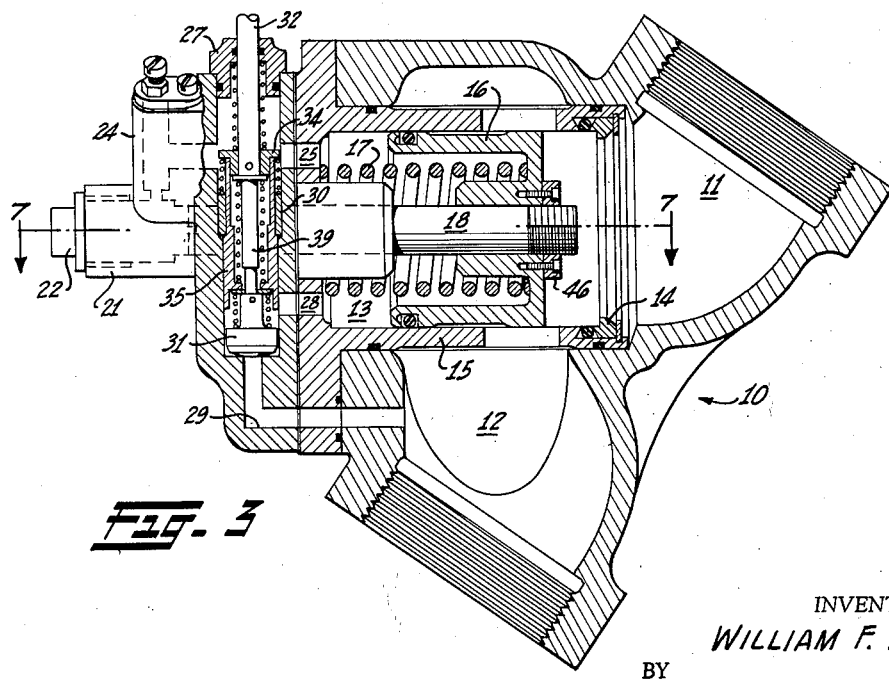
FIG. 3 is another section of the valve structure shown in FIGS. 1 and 2, but illustrating the structural relationship of parts with the valve in its fixed, predetermined position intermediate fully-open and closed positions.

This invention is more particularly directed to the novel structures by which the piston valve element 16 is moved by snap action into fully open, closed or predetermined intermediate position, each of the positions of operation being shown in FIGS. 1, 2 and 3, respectively.

Valve housing 10 includes a pair of passageways which fluidly communicate with the valve chamber 13. A first passageway extends coaxially through a tubular member 18 that is secured to piston 16 and reciprocally movable in a boss 19. The fluid passing through tubular member 19 discharges into a cavity 20 formed in a sleeve portion 21 of the housing 10, cavity 20 being sealed by an end plug 22. The first fluid passageway continues from the cavity 20 through the bore 23 of an adjustable needle valve 24, then through a conduit line 25 which intersects the bore cavity 26 of a control valve 27 and opens into chamber 13. Depending upon the position of control valve 27 the upstream fluid pressure in chamber 13 may be transmitted through the first passageway and applied against the back side of piston 16, as shown in FIG. 1. Inasmuch as the surface area of applied fluid pressures on front and back sides of the piston are substantially equal, the piston will be moved against the valve seat 14 by the spring 17 whenever the pressure within chamber 13 is approximately equal to that pressure in the inlet chamber 11.

It will be noted that tubular member 18 extends through a portion of bore cavity 26 of control valve 27 as shown in FIGS. 5–7, for a purpose which is to be explained.

A second fluid passageway is provided for relieving chamber 13 of its fluid pressure, said passageway communicating with outlet chamber 12 through conduit line 28, the bore cavity of control valve 27 and a line passage 29.

Control valve 27 is comprised of two movable valve elements, a valve sleeve 30 and a poppet valve 31, which elements are respectively associated with the first and second passageways to control the passage of fluids therethrough. Both valve elements are mounted to and actuated by an operating rod 32 that may be reciprocated by manual operation of a handle 33, as shown in FIG. 4.

Operating rod 32 pivotally connects to a guide bushing 34 having a sleeve extension 35 secured thereto. Valve sleeve 30, in turn, is supported upon sleeve extension 35, being lodged between the annular periphery of bushing 34 and a shoulder 36 of the sleeve extension; and a spring 37 seated against bushing 34 urges valve sleeve 30 against a shoulder 36.

Sleeve extension 35 is formed with an internal neck 38 through which a valve stem 39 projects; and it is to this valve stem that the poppet valve 31 is pivotally mounted. A washer member 40, loosely mounted on a reduced diameter portion of stem 39, is urged against the neck 38 by a helical spring 41 interposed between the poppet valve 31 and the washer. Also, that end of valve stem 39 which is within sleeve extension 35 is provided with a collar member 42, and a helical spring 43 is disposed between neck 38 and collar member 42.

In the normal position of the pilot valve 27, as shown in FIG. 1, the shoulder 38 of sleeve extension 35 is held against washer 40 by spring 44. The spring constant of spring 44 is preferably slightly less than that of spring 41, but the forces of these two springs are balanced in the normal position shown where poppet valve 31 is engaged with a valve seat 45 (closing off the second passageway) and valve sleeve 30 is displaced from conduit line 25 allowing fluid to pass through the first passageway into chamber 13. It will be noted that sleeve extension 35 may be moved in either direction from the normal position of FIG. 1 by manual actuation of the operating rod 32. In such event the forces of springs 41 and 44 will be unbalanced by the manual force of operation and will tend to return to the normal position when rod 32 is freed.

Tubular member 18 is secured to piston 16 but may be adjusted axially thereof for a reason to be explained. More particularly, a nut plate 46 is attached to the upstream face of piston 16 by screws 47; and tubular member 18 is threadedly mated therewith at one end. The opposite end of tubular member 18 is formed with a transverse slot 48, axially accessible through a sleeve portion 21 of the housing after removal of plug 22. Also, tubular member 18 is provided with a key slot 49 and a groove 50, as shown in FIGS. 5–7. A set screw 51 secured to the housing 10 normally engages with the key slot 49 and restricts movement of the tubular member 18 to an axial reciprocation. However, the set screw may be retracted from the key slot 49 to permit the tubular member to be rotated by inserting a tool into engagement with transverse slot 48, thereby effecting an axial adjustment of the tubular member relative to nut plate 46 and piston 16.

Groove 50 is located on member 18 so as to be engaged by valve sleeve 30 when main valve 16 is an open position. The end 50a of groove 50 serves as a stop surface that is engaged by valve sleeve 30 when the valve 16 is operated toward a closed position providing that the sleeve 30 is actuated to a position of engagement, as shown by FIGS. 3 and 7.

The operation of the metering valve will best be understood in view of the drawings, FIGS. 1 and 5, FIGS. 2 and 6, and FIGS. 3 and 7, representing three distinct operating conditions. As previously indicated, FIGS. 1 and 5 illustrate the normal relationship of parts when no external forces are applied to the operating rod 32 as through the manually operable handle 33; and in this condition the first passageway is open, allowing the line pressure on the upstream side of piston 16 to be transmitted into chamber 13. Since the second passageway is then closed by the poppet valve 31, the fluid pressures on either side of piston 16 are balanced and spring 17 will hold the piston against valve seat 14.

Now, to open piston valve 16, an operator will move operator handle 33 into the broken line position A of FIG. 4, thereby causing rod 32 to be moved while compressing spring 44. Valve sleeve 30 will be brought into a position that obstructs fluid passage through conduit line 25; and spring 43 will be compressed until the force of this spring becomes greater than the fluid pressure holding poppet valve 31 against seat 45, at which time valve 31 snaps to the fully-open position shown by FIG. 2. In this condition valve 27 shuts off the first passageway connecting chambers 11 and 13 while opening the second passageway interconnecting chambers 12 and 13, allowing chamber 13 to be relieved of its pressure. The piston valve 16 is then opened by the fluid pressure on its upstream side, said pressure exceeding the bias force of spring 17.

It will be noted that piston valve 16 cannot be opened to a stable position intermediate closed and full-open since its position is determined by the pilot valve 27, which does not open the second passageway until after the first passageway has been fully closed. Furthermore, it will be seen that an attempt to operate piston valve 16 to a partially closed position (as by gradual return movement of valve 27) would be unsuccessful since the second passageway is not closed (and the pressure within chamber 13 is not retained) until after poppet valve 31 seats upon valve seat 45. Of course, fluid pressure in back of the poppet valve element 31 would tend to force the poppet valve against and to retain it upon seat 45, thereby preventing a reopening of the pressure relief passageway until the first passageway was again fully closed. Thus, it will be understood that the pilot valve 27 operates with snap action so as to move the piston valve element 16 toward either fully open or fully closed positions.

But in view of the particular cooperation between the groove 50 of tubular member 18 and the valve element 30, it is also possible to retain the piston valve 16 in a fixed, predetermined position suitable for allowing a relatively low flow of fluid, but one which can be accurately registered. The low flow position, shown in FIGS. 3 and 7, requires that the piston valve 16 be first opened, as explained above. This places groove 50 within the bore cavity 26 of the valve 27 and positioned to be engaged by valve sleeve 30. Now, movement of operating handle 33 into the broken line B position, shown in FIG. 4, will overstroke rod 32 relative to its normal position of FIG. 1, thereby causing spring 41 to be compressed by the sleeve extension 35 acting against washer 40. Valve sleeve 30 will also be moved into groove 50 by the overstroking movement of sleeve extension 35. In the event that rod 32 should be overstroked at a time when piston valve element 16 was closed (or nearly closed) spring 37 would prevent any injury to valve sleeve 30, allowing the element to be moved against a resilient force.

The axial adjustability of tubular member 18 relative to piston 16 permits the fixed, predetermined and intermediate position of that valve element to be adjusted, thereby effecting a control over the rate or permissible low flow. However, a seal device 52 interconnecting sleeve portion 21 and plug 22 is used to prevent undetected tampering with the flow adjustment. The seal device, if broken, provides visual indication that an adjustment may have been made without permission.

Also, the use of a metering valve 24 disposed in the pressure applying first passageway, extending between chambers 11 and 13, allows an adjustment to be made in the responsiveness of piston element 16 to operation of control valve 27. Obviously, it is desirable that a normal operation of handle 33 should place the pilot valve in any of its three positions. However, if the upstream fluid pressure were freely transmitted through the first passageway, it might be necessary to move the operating handle 33 with great haste in order to engage valve sleeve 30 with groove 50 before the piston becomes more fully closed than the intermediate position. This could cause undue wear of parts, in addition to the difficulty in operation. But it will be apparent also that over restriction of the fluid flow through the first passageway would delay closing of main valve 16 and be unsatisfactory from the standpoint of control in the operation. Therefore, the needle valve 24 serves the useful function of adjusting the fluid flow through the first passageway, which may require different adjustment settings for particular upstream flow pressures. A seal device 53 may be used to prevent inadvertent or undetected changes to be made in the adjustment of needle valve 24.

It is to be understood that the form of the invention herewith shown and described is to be taken as a preferred example thereof, and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. A shut-off valve device for metered flow lines having positions of full-open, closed and an intermediate position of registrable low flow, said valve comprising:

a valve housing having a fluid passage therethrough, a main valve element disposed in said housing and movable between a closed position and a full-open position, said valve element being closed by movement in a direction opposed to normal fluid flow through said passage, means defining first and second fluid passageways, said first passageway fluidly communicating with said housing passage on the upstream side of said valve element for applying a closing force to said main valve element, said second fluid passageway communicating with said housing passage on the downstream side of said main valve element for relieving said closing force, means applying a closing bias force to said main valve element, means including a control valve selectively operable for allowing fluid to pass either through said first passageway or said second passageway, and means associated with movement of said control valve for securing said main valve element at a fixed, predetermined position intermediate full-open and closed.

2. The valve structure of claim 1 wherein said means associated with movement of said control valve will secure said main valve element only after said main valve element is moved into its full-open position.

3. The valve structure of claim 1 and further including adjustable means disposed in said first passageway for restricting fluid flow therethrough, thereby regulating the speed with which the main valve element is moved toward its closed position.

4. The valve structure of claim 1 wherein said main valve element is reciprocally movable in said housing and includes an axial stem member having a catch recess formed on a surface portion thereof, said catch recess being positioned to be engaged by said means associated with movement of said control valve after said main valve element has been opened.

5. The valve structure of claim 4 wherein said axial stem member is tubular and defines a portion of said first fluid passageway which extends through said main valve element.

6. The valve structure of claim 4 wherein said means associated with movement of said control valve will engage said catch recess only after said second passageway is blocked and said first passageway is opened.

7. The valve structure of claim 4 wherein said stem member is mounted to said main valve element by means providing a connection allowing axial adjustment therebetween.

8. The valve structure of claim 1 wherein said control valve includes first and second valve elements respectively adapted to seat in said first and second passageways, said control valve also including a reciprocated control valve operating stem for moving said valve elements into and out of valve seating positions, said second valve element seating in the direction of fluid flow passing through said second passageway.

9. The valve structure of claim 8 wherein said second valve element is resiliently connected to said control valve operating stem by spring means, allowing said second valve element to be moved with snap action from a valve seated position into a full-open position when the resilient force applied thereto by movement of said valve operating stem exceeds the fluid pressure within said second passageway tending to hold said second valve element in a valve seated position.

10. The valve structure of claim 9 and further including means for resiliently urging said control operating stem in a direction to return said second valve element toward a valve seated position.

11. The valve structure of claim 8 wherein said means associated with movement of said control valve is attached to said control valve operating stem and will engage said main valve element only after said first control valve element is opened and said second control valve element is moved into a valve seated position.

12. The valve structure of claim 8 wherein said main valve element is reciprocally movable in said housing and includes an axial stem member, said axial stem having a catch recess formed on a surface portion thereof, said catch recess being located to be engaged by means attached to said control valve operating stem after said main valve element has been opened.

13. The valve structure of claim 12 wherein said stem member is mounted to said main valve element by means providing a connection allowing axial adjustment.

14. The valve structure of claim 12 wherein said means attached to said control valve operating stem is located for engagement with the catch recess of said axial stem only after said second passageway is blocked and said first passageway is opened by operation of said control valve.

15. A shut-off valve device for metered flow lines comprising:

a valve housing having a fluid passage therethrough, a main valve element disposed in said housing and movable between a closed position and a full-open position, said valve element being closed by movement in a direction opposed to normal fluid flow through said passage, means defining first and second fluid passageways, said first passageway fluidly communicating with said housing passage on the upstream side of said valve element for applying a closing force to said main valve element, said second fluid passageway communicating with said housing passage on the downstream side of said main valve element for relieving said closing force, means applying a closing bias force to said main valve element, and means including a control valve selectively operable for allowing fluid to pass either through said first passageway or said second passageway, said control valve including first and second valve elements respectively, adapted to seat in said first and second passageways, said second valve element seating in a direction of fluid flow passing through said second passageway, and means resiliently interconnecting said first and second valve elements for moving said second valve element with snap action from a valve seated position into a full-open position after said first valve element obstructs said first passageway and when the force applied to said second valve element by movement of said first valve element exceeds the fluid pressure within said second passageway tending to hold said second valve element in a valve seated position.

16. The valve structure of claim 15 and further including means associated with movement of said control valve for securing said main valve element at a fixed, predetermined position intermediate full-open and closed.

17. The valve structure of claim 16 and further including adjustable means disposed in said first passageway for restricting fluid flow therethrough, thereby regulating the speed with which the main valve element is moved toward its closed position.

18. The valve structure of claim 16 wherein said main valve element is provided with an axially adjustable valve stem having a stop that may be engaged by said means associated with movement of said control valve.

References Cited in the file of this patent
UNITED STATES PATENTS
2,361,225    Meyer ------------------ Oct. 24, 1944